United States Patent
Ali et al.

(10) Patent No.: US 11,682,242 B1
(45) Date of Patent: Jun. 20, 2023

(54) FACILITATION OF INGRESS TO A PASSENGER COMPARTMENT OF A VEHICLE

(71) Applicant: Zoox, Inc., Foster City, CA (US)

(72) Inventors: Mohammed Imran Ali, San Francisco, CA (US); Ari Goldberg, San Mateo, CA (US); Koun Han, San Francisco, CA (US); Jacob Avi Harper, Alameda, CA (US); Andrew Allen Haskin, San Francisco, CA (US); Marina Camille Josephs, San Jose, CA (US); Michael Moshe Kohen, Palo Alto, CA (US); Devon Langston, Foster City, CA (US); Justin Calvin Leung, San Francisco, CA (US); Mark R. Rosekind, Mountain View, CA (US); Christopher John Stoffel, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 250 days.

(21) Appl. No.: 17/247,231

(22) Filed: Dec. 4, 2020

(51) Int. Cl.
| | |
|---|---|
| *G07C 5/00* | (2006.01) |
| *B60R 21/0136* | (2006.01) |
| *B60R 21/015* | (2006.01) |
| *G08B 5/06* | (2006.01) |
| *G07C 5/08* | (2006.01) |
| *B60Q 3/80* | (2017.01) |
| *B60R 21/00* | (2006.01) |

(52) U.S. Cl.
CPC .......... *G07C 5/008* (2013.01); *B60R 21/0136* (2013.01); *B60R 21/01512* (2014.10); *G07C 5/0816* (2013.01); *G08B 5/06* (2013.01); *B60Q 3/80* (2017.02); *B60R 2021/0027* (2013.01)

(58) Field of Classification Search
CPC .................. G07C 5/008; G07C 5/0816; B60R 21/01512; B60R 21/0136; B60R 2021/0027; G08B 5/06
See application file for complete search history.

(56) References Cited

U.S. PATENT DOCUMENTS

| 5,014,038 | A | * | 5/1991 | Leigh-Monstevens ...................... B60R 25/02144 340/456 |
| 5,416,360 | A | * | 5/1995 | Huber .................. B60R 21/0132 340/436 |
| 6,922,622 | B2 | * | 7/2005 | Dulin .............. B60W 30/18054 701/45 |
| 8,229,624 | B2 | * | 7/2012 | Breed .................. B60R 21/0132 701/36 |
| 2002/0188392 | A1 | * | 12/2002 | Breed .................. B60N 2/0276 701/45 |

(Continued)

*Primary Examiner* — Gertrude Arthur Jeanglaude
(74) *Attorney, Agent, or Firm* — Lee & Hayes, P.C.

(57) ABSTRACT

A vehicle safety system of a vehicle facilitates safe exigency ingress into a vehicle. The vehicle safety system may receive data associated with a condition of the vehicle (e.g., from sensors, components, remote signals, passenger input, etc.). Based at least in part on the data associated with the condition of the vehicle, the vehicle safety system may detect a triggering event associated with the ingress of a passenger compartment of the vehicle. Based at least in part on the triggering event, the vehicle safety system may perform a vehicular safety measure associated with ingress to the passenger compartment of the vehicle.

20 Claims, 7 Drawing Sheets

(56) References Cited

U.S. PATENT DOCUMENTS

2017/0300059 A1* 10/2017 Rust ...................... G01S 17/931
2018/0354502 A1* 12/2018 Yaldo ................. B62D 15/0285
2019/0111838 A1* 4/2019 Hanson .................... G07C 5/08

* cited by examiner

FACILITATION OF INGRESS TO A PASSENGER COMPARTMENT OF A VEHICLE

BACKGROUND

With the increasingly greater variety and advances in vehicles, first responders are not always trained or knowledgeable on how to ingress a vehicle during an emergency in the safest manner available. For example, there may be instances when a first responder may need access to the interior of a vehicle when the occupant may be unresponsive, or there may be no occupant. This may occur after a vehicular incident that causes severe damage to an autonomous or semi-autonomous vehicle. If so, a first responder on the scene may need to quickly and safely extricate the occupant from the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
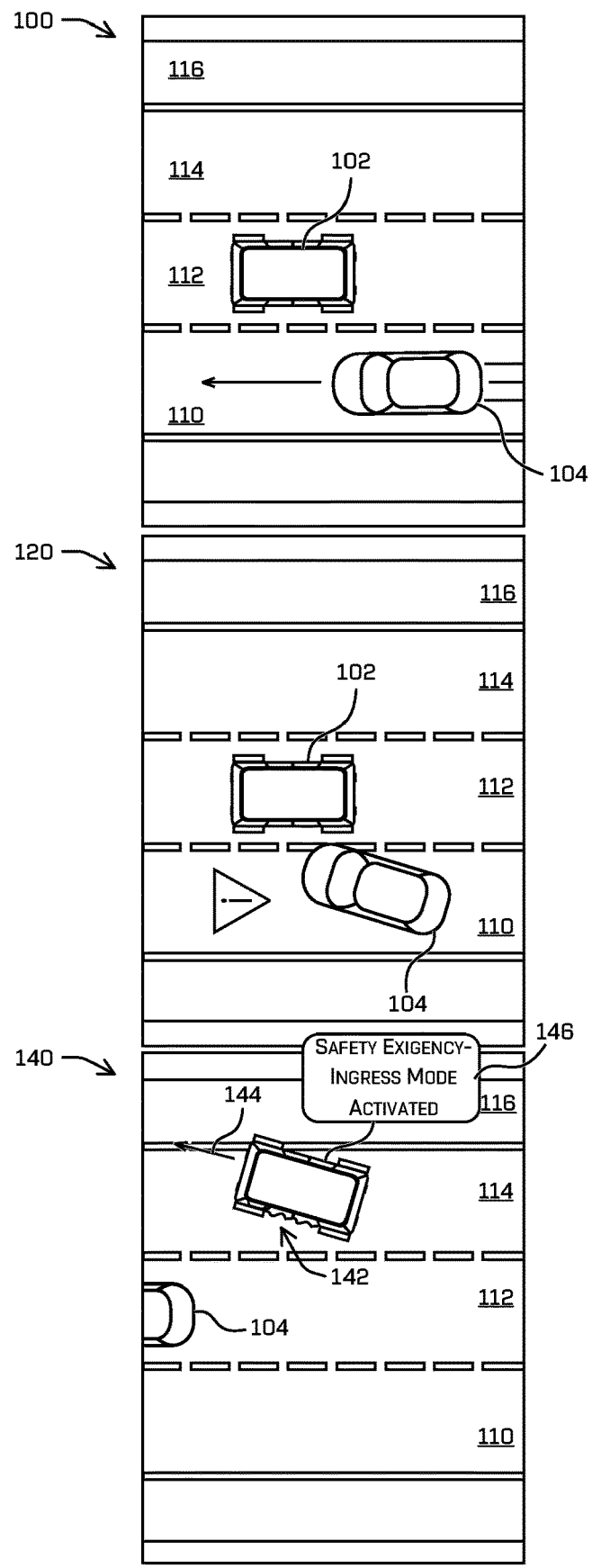
FIG. 1 shows three panels that illustrate an overhead view of two vehicles involved in a vehicular incident while traveling the same direction on a three-lane roadway and the initiation of the safety exigency-ingress mode, in accordance with certain techniques described herein.

As discussed above, first responders are not always trained or knowledgeable on how to quickly and safely access a passenger compartment of a modern vehicle. For example, there may be instances when a first responder may need access to the interior of a vehicle to extricate an unresponsive occupant in the vehicle.

This application relates to the detection of an event that triggers a safety exigency-ingress mode of a vehicle. In this mode, the vehicle performs vehicular safety measures designed to enable a first responder to quickly and safely access (e.g., ingress) the passenger compartment of the vehicle. For example, the safety measures may include illumination of an exigency door-release mechanism and presentation of visual indicator on the occupant-protection system that shows how to access the passenger compartment.

While the examples are described herein within the context of an autonomous vehicle, the techniques are also applicable to semi-autonomous and manually driven vehicles. Herein, a first responder is a person with specialized training who is among the first to arrive on-scene and assist the scene of an emergency, such as a vehicle accident. Herein, an exigency ingress is an urgent situation requiring quick entry to and/or access to the passenger compartment of a vehicle.

The vehicle may include a safety system that places the vehicle into a safety exigency-ingress mode when conditions warrant a likely exigency ingress by a first responder. The conditions warrant the safety exigency-ingress mode when, for example, the life or health of an occupant of the vehicle, a first responder, pedestrian, and/or occupants of other vehicles are potentially at risk, and exigent ingress into the vehicle by a first responder may ameliorate that risk (e.g., safe a life or prevent injury).

The vehicle safety system may receive data associated with a condition of the vehicle (e.g., from sensors, components, remote signals, passenger input, etc.). At least in part, based on the condition of the vehicle associated with the sensor data, the vehicle safety system detects a triggering event associated with access (e.g., ingress) of a passenger compartment of the vehicle. Additional details regarding vehicle sensors can be found in U.S. Pat. Nos. 9,517,767; 9,630,619; 10,737,652; and 10,745,003, which are incorporated herein by reference in its entirety.

If so, the vehicle safety system places the vehicle into the safety exigency-ingress mode. In this mode, the vehicle safety system may perform vehicular safety measures to facilitate, encourage, instruct, and/or enable access to the passenger compartment of the vehicle by a first responder. In this mode, the vehicle safety system may generate a vehicle-proximity notification to a first responder to perform the exigency ingress into the vehicle.

In various examples described herein, the vehicle may detect an event that triggers the vehicle safety system to place the vehicle into the safety exigency-ingress mode. In response to such a trigger being detected, the vehicle safety system activates the safety exigency-ingress mode. This activation may include the production, transmission, or reception of the indication to permit the exigency ingress into the vehicle by the one or more first responders.

In some instances, the triggering event may be initiated by one of three sources: an occupant, remote operations, or automatically by the vehicle itself. The occupant (e.g., passenger) of the vehicle may purposefully trigger the activation of the safety exigency-ingress mode. The occupant of the vehicle may be a driver or passenger of the vehicle. Operators in the remote operations may purposefully trigger the safety exigency-ingress mode in response, for example, to a request from first responders to do so. Systems on the vehicle itself may detect a vehicular triggering condition and automatically activate the safety exigency-ingress mode. For example, the vehicle may detect a vehicular impact that is significant enough to warrant intervention by first responders.

Many different events may trigger the activation of the safety exigency-ingress mode. In some instances, the vehicle may detect a sufficiently significant vehicular impact. For example, the trigger may be in response to both a detection that a vehicular impact has occurred and the impact or damage was sufficient to warrant assistance from a first responder. In some instances, the impact or damage may be sufficient when vehicle airbags of an occupant-protection system are deployed in response.

The airbags are part of the occupant-protection system of a vehicle. In response to a vehicular impact, an airbag is designed to inflate extremely quickly to protect the occupants, and then quickly deflate. Additional details regarding occupant-protection systems with airbags can be found in U.S. Pat. Nos. 10,703,323 and 10,471,923, which are incorporated herein by reference in its entirety A non-exhaustive list of events that can trigger activation of the safety exigency-ingress mode include, for example, an indication of an attempt by a first responder to ingress the passenger compartment of the vehicle, input from a passenger of the vehicle, detection of a vehicular impact, detection of a temperature in the passenger compartment exceeding a threshold temperature, deployment of the airbags occupant-protection system of the vehicle, detection of a thermal event (e.g., smoke and/or fire) in the passenger compartment (in-vehicle medical emergency, detection of a malfunction associated with a component of the vehicle, detection of proximity of an emergency vehicle, detection of one or more error codes associated with one or more components and/or subcomponents (e.g., loss of pressure in a tire or fluidic system of the vehicle, temperature of a battery, a low or overvoltage signal from a battery, etc.), a divergence from a planned trajectory more than a threshold amount (e.g., where the vehicle is unable to move along a planned trajectory), a loss of power and/or communication, and/or an instruction from a remote operations computing device.

In some examples, other events that may additionally or alternatively trigger activation of the safety exigency-ingress mode include, for example, voice-recognition command to activate an exigency ingress mode of the vehicle, detection of dangerous in-vehicle occupant behavior, and/or detection of an abandoned child or pet.

In various examples described herein, the safety measures taken when the vehicle is in safety exigency-ingress mode include, for example, illuminating an exigency access mechanism, deploying an occupant-protection system including a visual indicator showing how to ingress the passenger compartment of the vehicle, outputting an audible instruction describing how to ingress the passenger compartment of the vehicle, and/or initiating a communication connection between a communication device in an interior of the passenger compartment and a communication device of a first responder.

In other examples described herein, the safety measures taken when the vehicle is in safety exigency-ingress mode may include, for example, safely halting the vehicle, interior lights illumination, exterior lights illumination, disconnection of an electric-vehicle battery (EVB), and/or communication with emergency services (e.g., calling 911).

When the EVB is disconnected, many of the primary propulsion systems fail to operate due to a lack of power. Thus, EVB disconnection occurs when the vehicle is not moving or otherwise safe. Thus, the EVB disconnection is delayed or avoided when the vehicle is in motion, for example.

The purpose of the vehicle-proximity notification is to facilitate the safe and quick ingress of the passenger compartment of the vehicle. Thus, in various examples described herein, the vehicle-proximity notifications provided when the vehicle is in safety exigency-ingress mode include, for example, an indication of how to ingress the passenger compartment of the vehicle, the data associated with the condition of the vehicle, image data associated with an interior of the vehicle, audio data associated with an interior of the vehicle, sensor data associated with an exterior environment proximate the vehicle, location data associated with the vehicle, and/or a direction of travel associated with the vehicle.

In various other examples described herein, the vehicle-proximity notifications provided when the vehicle is in safety exigency-ingress mode may include, for example, an on-screen textual message, on-screen video message, exterior audio message, illumination of an exigency access mechanism (e.g., a door-release lever), presentation of printed textual message regarding the exigency access mechanism, presentation of graphical direction indicators regarding the exigency access mechanism, presentation of directions regarding the exigency access mechanism on a deployed vehicle airbag, sharing vehicle location information with first responders, and sharing vehicle direction-of-travel information with first responders.

When the EVB is disconnected, vehicle-proximity notifications may be produced to notify first responders and others around the vehicle that the EVB is disconnected. For example, such a message may be audible from an exterior speaker and/or a visual text or graphic on a display of the vehicle.

FIG. 1 shows three panels 100, 120, and 140 that illustrate an overhead view of two vehicles involved in a vehicular incident while traveling the same direction on a three-lane roadway. Each panel includes a vehicle 102 being overtaken by another vehicle 104.

Panel 100 depicts the vehicle 102 traveling right-to-left in a center lane 112 of the three-lane roadway. The vehicle 104 is also traveling right-to-left in a far-left lane 110 of the three-lane roadway and approaches the vehicle 102 at a much greater speed than vehicle 102. As shown in panel 100, a far-right lane 114 and a shoulder 116 are unoccupied.

Panel 120 depicts the vehicles 102 and 104 in the same lanes, as shown in panel 100. Unfortunately, as the vehicle 104 come alongside the vehicle 102, the vehicle 104 makes an unsafe lane change and crosses from its far-left lane 110 and into the center lane 112, which is still occupied by the vehicle 102. Presumably, the vehicle 102 may take evasive action. However, the vehicle 104 will impact the left side of the vehicle 102.

Panel 140 depicts the vehicles after the vehicle 104 has impacted vehicle 102. Vehicle 104 is traveling in the center lane 112 and is nearly out of the panel 140 because the vehicle 104 has maintained its high-speed travel. To avoid the dangerous lane change of the vehicle 104, the vehicle 102 is now traveling in the far-right lane 114, but is pulling over to the shoulder 116. Vehicle 102 has sustained damage 142 to its left side due to the sideswipe impact caused by the vehicle 104.

As indicated by decision bubble 146, the vehicle 102 detects the impact caused by the vehicle 104 and activates the safety exigency-ingress mode. The vehicle 102 determines that the impact was sufficiently significant to warrant intervention by a first responder. Thus, the vehicle 102 is placed into the vehicle into safety exigency-ingress mode. In response, the vehicle 102 takes appropriate safety measures. An example of such a safety measure includes safely halting vehicle 102. As shown in panel 140 by directional arrow 144, vehicle 102 starts to pull over onto the shoulder 116 of the roadway.

Figure 2:
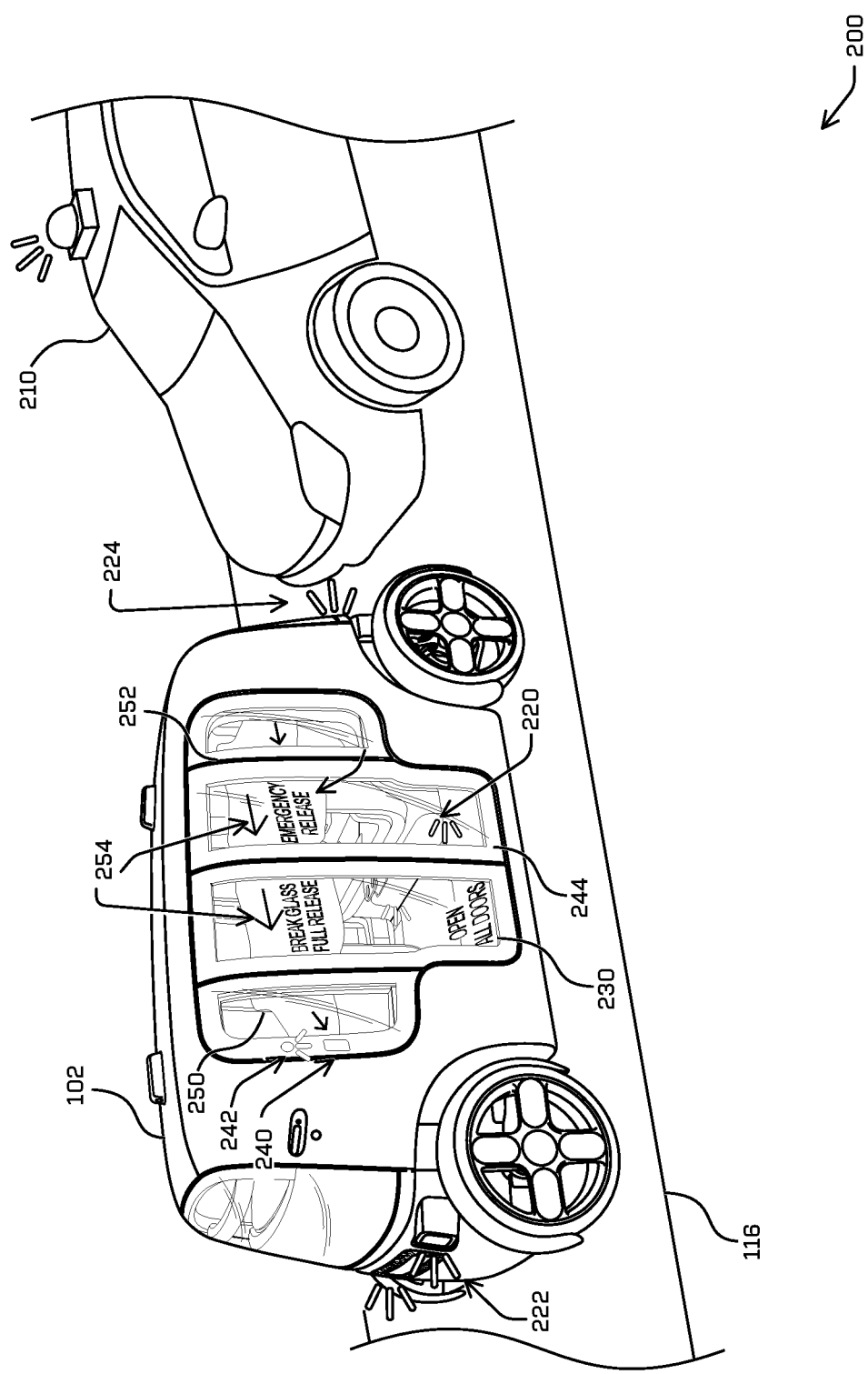
FIG. 2 illustrates an example scenario in which a vehicle is in the safety exigency-ingress mode, in accordance with certain techniques described herein, as the vehicle is parked on the shoulder of a roadway.

FIG. 2 illustrates example scenario 200 in which the vehicle 102 is in the safety exigency-ingress mode as it is parked on the shoulder 116 of the roadway. A first-responder vehicle 210 parked immediately behind the vehicle 102. More particularly, the first-responder vehicle 210 is a police car. In this figure, the first responder herself is not shown.

A first responder is a person with specialized training who is among the first to arrive on-scene and assist the scene of an emergency, such as a vehicle accident. Examples of first responders include law enforcement officers, healthcare workers (including nurses and doctors), emergency medical technicians (EMTs), government officials, or government-certified agents tasked with responding to an accident, medical emergency, crime, natural disaster, or terrorism.

As depicted, the vehicle 102 includes vehicle-interior lights 220, vehicle-exterior lights 222 and 224, mode-activated illuminated signage 230, a door-release lever 240, pillar lamp 242 to illuminate the door-release lever, a door 244, deployed vehicle airbag curtains 250 and 252, on-curtain graphical directional indicators 254 regarding door-release lever, and on-curtain textual instructions 256 and 258 regarding door-release lever.

Together, panel 140 and FIG. 2 illustrate the vehicle 102 safely halting the vehicle. That is, panel 140 shows the vehicle 102 traveling in the far-right lane 114 when the safety exigency-ingress mode is activated. As indicated by direction arrow 144, vehicle 102 begins to decelerate and pull over onto the shoulder 116. FIG. 2 shows the vehicle 102 at a stop on the shoulder 116. Safely halting the vehicle is one of the safety measures taken when the safety exigency-ingress mode is activated. When activated, if the vehicle is moving or is located in a location that is subject to the danger of traffic, then the vehicle moves to a traffic-safe location and stops at that location.

As depicted, the vehicle 102 demonstrates several other examples of safety measures taken when the vehicle is in safety exigency-ingress mode. Those examples include the vehicle-interior lights 220 and the vehicle-exterior lights 222 and 224. The vehicle-interior lights 220 illuminates the vehicle interior. Especially at night, such illumination improves visibility in the vehicle for occupants and for and by first responders approaching the vehicle 102. Especially at night, the vehicle-exterior lights 222 and 224 illuminates the exterior of the vehicle 102. The vehicle-exterior lights 222 and 224 help first responders locate the vehicle 102 and see around the outside of the vehicle as well.

Figure 3:
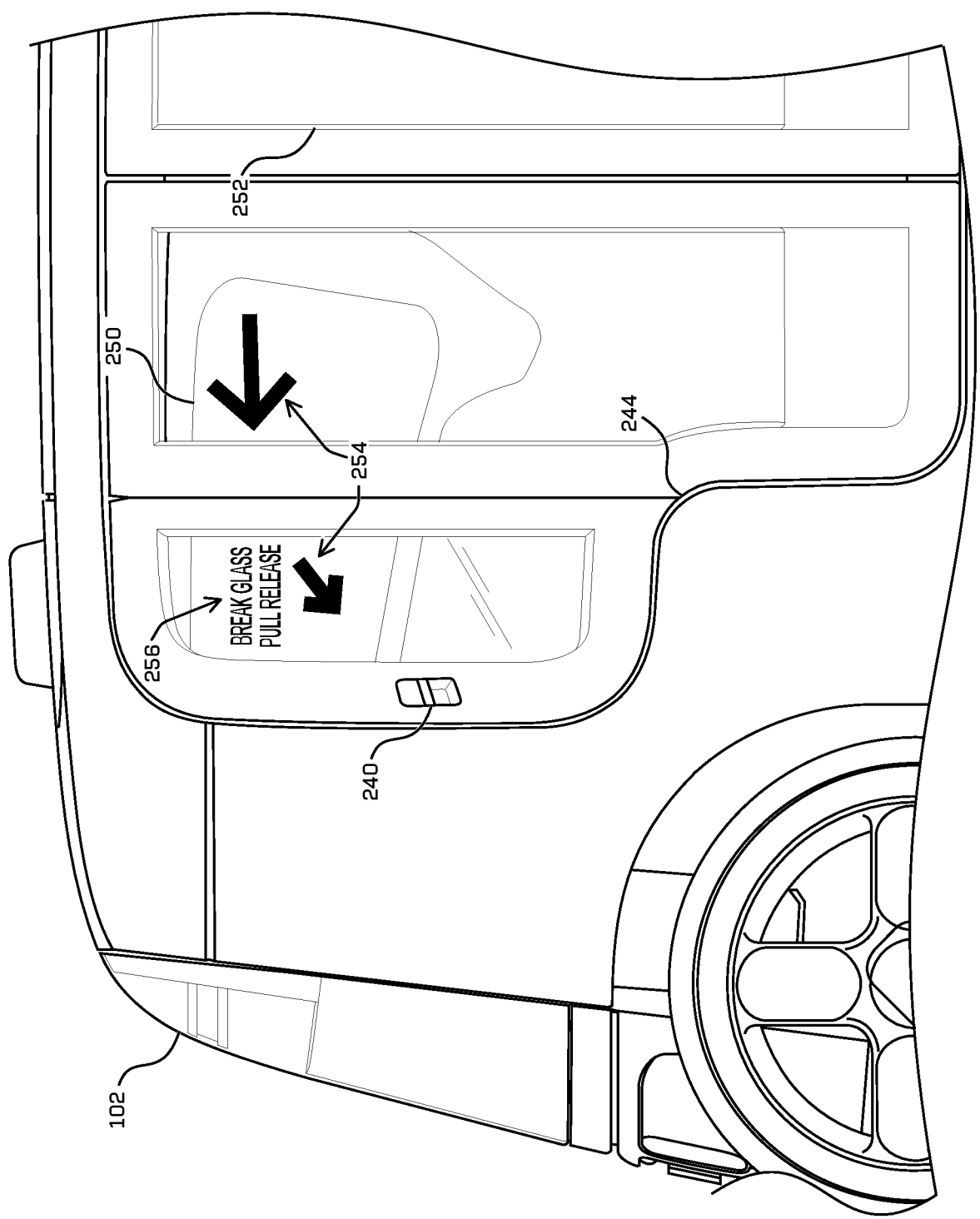
FIG. 3 illustrates a close-up of a portion of the vehicle of FIG. 2. The vehicle is in safety exigency-ingress mode, in accordance with certain techniques described herein.

FIG. 3 illustrates a close-up of a portion of the vehicle 102, in example scenario 200. This figure shows a closer view and different angled view of the vehicle 102, the door-release lever 240, a door 244, the deployed vehicle occupant-restraint 250, the on-curtain graphical directional indicators 254 regarding door-release lever, and the on-curtain textual instructions 256 regarding door-release lever.

Figure 4:
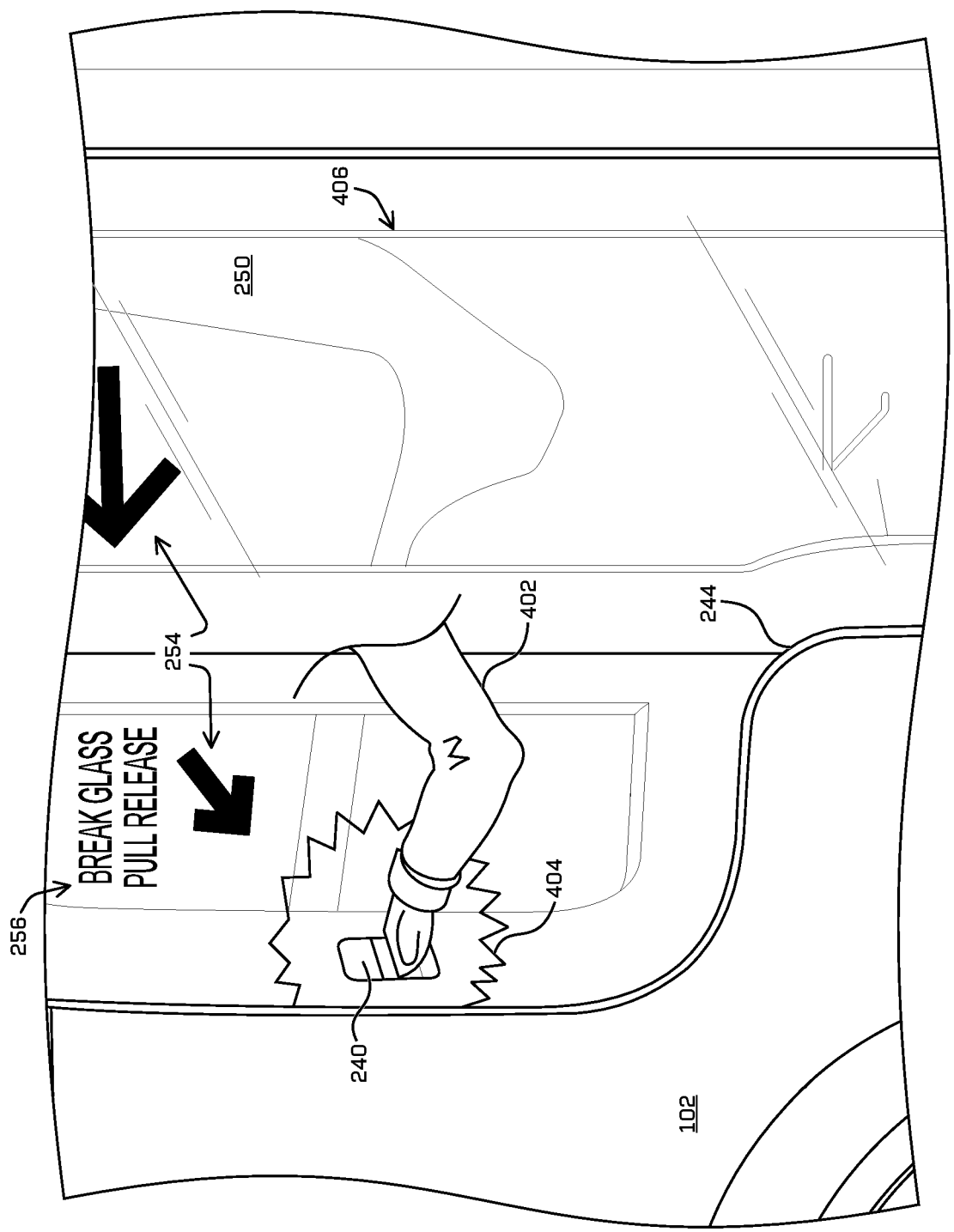
FIG. 4 shows a still closer view of the portion of the vehicle like that shown in FIG. 3. The vehicle is in safety exigency-ingress mode, in accordance with certain techniques described herein.

FIG. 4 shows a still closer view of the portion of vehicle 102 like that shown in FIG. 3. This figure shows a portion of the vehicle 102, the door-release lever 240, the door 244, the deployed vehicle occupant-restraint 250, the on-curtain graphical directional indicators 254 regarding door-release lever, and the on-curtain textual instructions 256 regarding door-release lever.

As depicted in FIGS. 2, 3, and/or 4, the vehicle 102 demonstrates several other examples of the vehicle-proximity notifications provided when the vehicle is in safety exigency-ingress mode. These are notifications or messages are intended for those—such as first responders—nearby the vehicle 102. An example of depicted vehicle-proximity notifications includes an on-screen textual message presented on the mode-activated illuminated signage 230. The mode-activated illuminated signage 230 may be a display screen, or it may be a projection or matrix of lights that are activated to spell-out designated messages.

As shown in FIG. 2, the example message of the mode-activated illuminated signage 230 is OPEN ALL DOORS. This informs the occupants to open the doors if they can do so. Otherwise, it instructs the first responders to open the doors. Alternatively, or in addition, the message may state that the vehicle is in the safety exigency-ingress mode.

In other instances, the message may inform the first responder that the EVB (not shown) of the vehicle 102 has been disconnected. This way, the first responders can be assured that it is safe to approach the vehicle.

The vehicle 102 may include one or more doors movably connected to a frame, body, and/or another component of the vehicle via one or more vehicle door actuator assemblies. Additional details regarding vehicle door actuator assemblies can be found in U.S. Pat. No. 10,633,908, which is incorporated herein by reference in its entirety When in safety exigency mode, the latches of the doors (e.g., door 244) may be closed and unreleased in response to, for example, a vehicular impact detection. That is, the door latches may remain closed, at least momentarily, to an occupant exiting a vehicle without desirable precautions. In other instances, the latches of the doors (e.g., door 244) may be unreleased to enable the occupants to quickly and safely exit the vehicle.

As depicted in FIGS. 2, 3, and/or 4, the door-release lever 240 is located on a door pillar. When pulled by a first responder 402, the door-release lever 240 releases the latch of door 244 of the vehicle 102. Often in exigency-ingress situations, the latch of door 244 may not open quickly and easily. There are many possible reasons for this. Such reasons include the latch of door 244 being closed but door will not normally release because of a lack of power. In some instances, the latch of door 244 may be closed, at least momentarily, in response to an impact detection.

In at least some examples, the nominal state of the door latch (e.g., unreleased vs. released) may be based at least in part on the event, a location of the vehicle, and the like to maximize the safety of the occupants until a first responder arrives. The first responders may be unfamiliar with the door-latch opening mechanics, the door-latch opening mechanics or electronics may be damaged, and the like. The door-release lever 240 is an example of the exigency access mechanism of the vehicle 102.

The door-release lever 240 is located behind the door window. First responders typically carry a tool for breaking car windows. FIG. 4 shows the first responder 402 reaching through a broken window 404 to pull the door-release lever 240. Thus, the first responder 402 may quickly gain ingress to the vehicle 102 by breaking the door window and pulling the door-release lever 240. In response, the door 244 releases or opens (as indicated by gap 406) so that the first responder may gain access to a passenger compartment of the vehicle 102.

To ensure that the first responders can quickly and easily know to use the door-release lever 240 and how to use the lever, several other examples vehicle-proximity notifications are shown FIGS. 2, 3, and/or 4. In this example, the pillar lamp 242 illuminates the door-release lever 240. However, in other examples, at least a portion of the door-release lever 240 itself may additionally or alternatively be illuminated (e.g., by a lighting element disposed in, on, or forming part of the door-release lever 240). In one example, a light-emitting element (e.g., one or more LEDs) may be disposed in a handle proximate to a distal end of the door-release lever 240. In some examples, the pillar lamp 242 and/or the light-emitting element of the door-release lever 240 may be configured to flash, blink, pulse, or otherwise change state to attract attention to the door-release lever 240. Thus, the first responder can quickly and easily see the door-release lever 240 upon approach to the vehicle.

Other example vehicle-proximity notifications may include emitting radio-frequency (RF) signals to notify devices in the proximity of the vehicle 102. Examples of such RF signals may include WiFi™, Bluetooth low energy (BTLE), near field communication (NFC), IPv6 over Low-Power Wireless Personal Area Networks (6LoWPAN), Ultra-Wideband (UWB), ZigBee (i.e., institute of Electrical and Electronics Engineers (IEEE) 802.15.4 standard), and the like.

As depicted in FIGS. 2, 3, and 4, the vehicle 102 has deployed vehicle airbag curtains 250 and 252, which in this example are illustrated as airbags. A vehicle airbag is designed to inflate extremely quickly to protect the occupants in case of a vehicle incident. The purpose of the vehicle airbags is to provide a vehicle occupant with a restraint to decelerate the occupant more gradually during a vehicle impact. However, in this example, the occupant-protection system serves the additional function of notifying and directing first responders how to ingress the passenger compartment of the vehicle.

As depicted in FIGS. 2, 3, and/or 4, the vehicle airbag curtains 250 and 252 are curtain or side restraints that can be deployed in response to a detection of an impact significant enough to trigger deployment. The vehicle airbag curtains 250 and 252 include the on-curtain graphical directional indicators 254 regarding door-release lever and the on-curtain textual instructions 256 and 258 regarding door-release lever.

As depicted in FIGS. 2, 3, and 4, the on-curtain graphical directional indicators 254 are arrows that point towards the door-release lever 240. As shown, the on-curtain textual instructions 256 says BREAK GLASS and PULL RELEASE, and the on-curtain textual instructions 258 says EMERGENCY RELEASE. However, in other examples, the instructions may take different forms (e.g., different textual messages, different graphical images, symbols, etc.).

To aid the assistance of an approaching first responder, the on-curtain graphical directions indicators 254 and textual instructions 256 face outward and are visible through the windows of the doors. Thus, the approaching first responder can follow the on-curtain graphical directions indicators 254 and textual instructions 256

Figure 5:
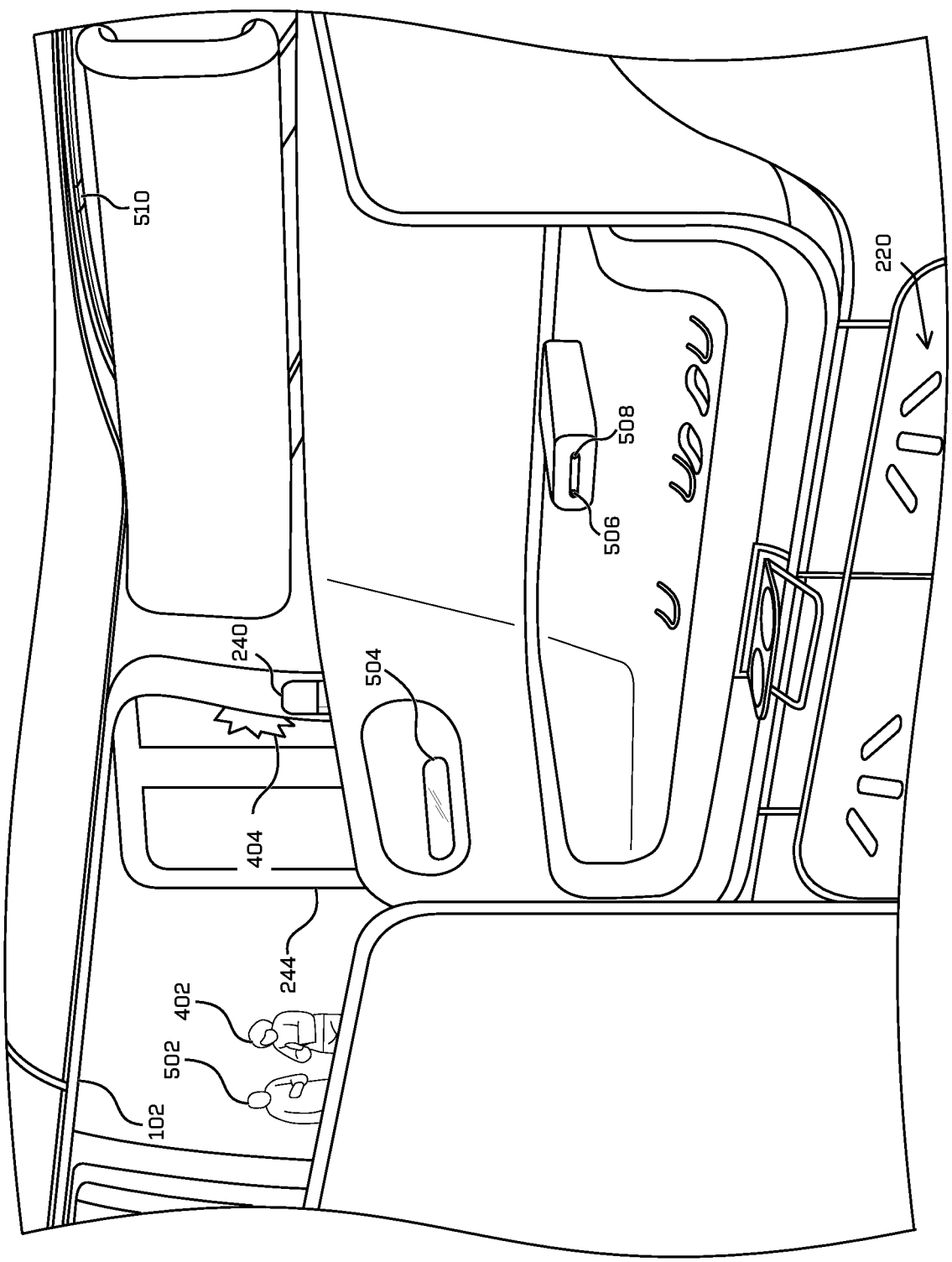
FIG. 5 illustrates a passenger compartment of a vehicle while the vehicle is in the safety exigency-ingress mode, in accordance with certain techniques described herein, and after a door has been opened by a first responder.

In some implementations, there may be on-curtain graphical directions indicators and textual instructions that face inward towards the occupants of the vehicle 102. In these implementations, inward-facing on-curtain graphical directions indicators and textual instructions would provide instructions and directions for the occupants to take exigency actions, such as opening doors, engaging additional safety measures, and communicating with first responders and/or remote operations. In addition, the vehicle 102 may generate audio and visual instructions in the passenger compartment to provide instructions and directions for the occupants to take exigency actions, such as opening doors, engaging additional safety measures, and communicating with first responders and/or remote operations FIG. 5 illustrates an interior view of a passenger compartment of the vehicle 102 while the vehicle is in the safety exigency-ingress mode and after the door 244 has been opened by the first responder 402. With the door 244 open, the first responder 402 can extricate an occupant 502 from the passenger compartment of the vehicle 102. Looking through the open door 244 and from the passenger compartment, the occupant 502 is seen talking with the first responder 402.

As depicted in FIG. 5, the passenger compartment of vehicle 102 includes the vehicle-interior lights 220, the mode-activated illuminated signage 230, a display screen 504, a microphone 506, speakers 508, a communications device (not shown), an emergency button 510, and a smoke/fire detector (not shown). In other example vehicles, these items (e.g., lights, screens, microphone, and speakers) could be located in different places within the passenger compartment.

The microphone and the speakers may be used for audio communication between the occupant 502 of the vehicle 102, first responders, and/or the remote operations. In addition, the microphone may be used for voice-recognition commands from the occupant 502. An interior video camera (not shown) may be used for video communications between the occupant 502 and the remote operations. The communications device may be used to communicate with the remote operations. The smoke/fire detector may trigger the safety exigency-ingress mode when it detects smoke and/or fire in the interior of the vehicle 102.

The occupant 502 may press the emergency button 510 to activate the safety exigency-ingress mode manually. Other implementations may include an interface so that the safety exigency-ingress mode when the occupant 502 is authorized to do so, and their identity is confirmed. In some implementations, the occupant 502 may have a special-purpose application on a mobile device that communicates with the vehicle 102. With this, the occupant 502 may activate the safety exigency-ingress mode through the application.

The mode-activated illuminated signage may read OPEN ALL DOORS. This message may direct a conscious occupant to open the door 244 from the interior of the vehicle 102. The display screen 504 may have a textual message that reads, for example, FIRST RESPONDERS ACCESS GRANTED. This message can be the indication that the vehicle 102 is in the safety exigency-ingress mode.

Figure 6:
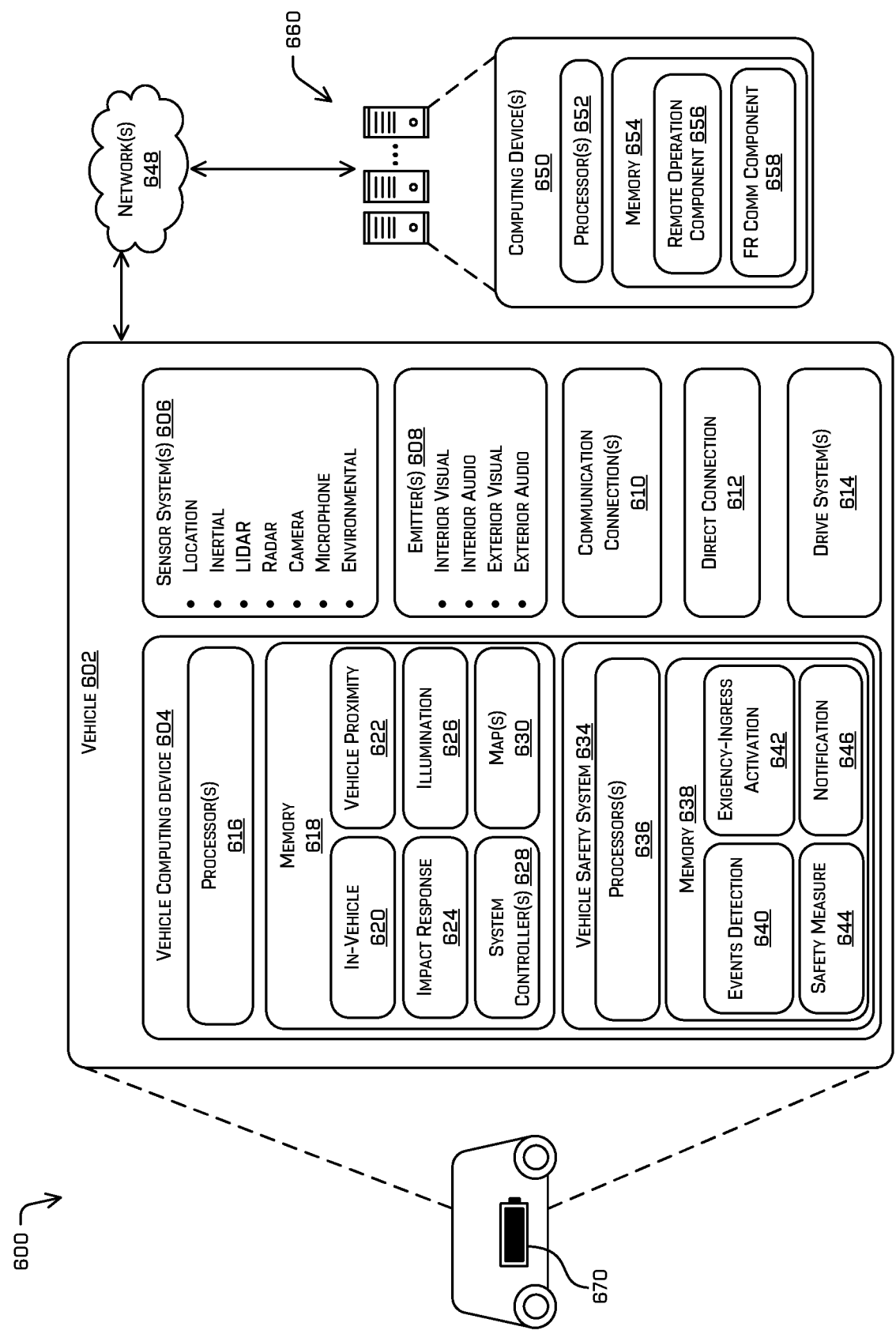
FIG. 6 illustrates a block diagram of an example system computing for implementing the techniques described herein.

FIG. 6 is a block diagram of an example computing system 600 for implementing the techniques described herein. In at least one example, the computing system 600 may include a vehicle 602, such as vehicle 102.

In some examples, the vehicle 602 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times to those that are partially or fully autonomously controlled.

The vehicle 602 may include one or more vehicle computing device(s) 604, one or more sensor systems 606, one or more emitters 608, one or more communication connections 610, at least one direct connection 612, one or more drive systems 614, and an EVB 670.

The vehicle computing device(s) 604 may include one or more processors 616 and memory system 618 communicatively coupled with the one or more processors 616. In the illustrated example, the memory system 618 of the vehicle computing device(s) 604 stores an in-vehicle event component 620, an external-vehicle event component 622, an impact response component 624, an illumination control component 626, one or more system controllers 628, and one or more maps 630.

Additionally, vehicle 602 may include a vehicle safety system 634, including an event detection and classifier component 640, an exigency-ingress (EI) activation component 642, a safety-measure component 644, and a first-responder vehicle-proximity notification component 646. As shown in this example, the vehicle safety system 634 may be implemented separately from the vehicle computing device(s) 604, for example, for improved performance of the vehicle safety system, and/or to provide redundancy, error checking, and/or validation of determinations and/or commands determined by the vehicle computing device(s) 604. However, in other examples, the vehicle safety system 634 may be implemented as one or more components within the same vehicle computing device(s) 604.

By way of example, the vehicle computing device(s) 604 may be considered to be a primary system, while the vehicle safety system 634 may be considered to be a secondary system. The primary system may generally perform processing to control how the vehicle maneuvers within an environment. The primary system may implement various artificial intelligence (AI) techniques, such as machine learning, to understand an environment around the vehicle 602 and/or instruct the vehicle 602 to move within the environment. For example, the primary system may implement the AI techniques to receive input that may be used to determine whether an event has occurred, detect the proximity of vehicles and objects around the vehicle 602, determine that an impact has occurred, control lights and screens, navigation, data communications, audio and/or video communications, and so on. In some examples, the primary system may process data from multiple types of sensors on the vehicle, such as light detection and ranging (lidar) sensors, radar sensors, image sensors, depth sensors, cameras, and the like, within the one or more sensor systems 606.

In some examples, the vehicle safety system 634 may operate as the separate system activates the safe exigency-ingress when warranted and AI techniques implemented by the primary system (e.g., the vehicle computing device(s) 604), and may perform various techniques described herein for normal operations of the vehicle 602. As described herein, the vehicle safety system 634 may implement techniques for obtaining an indication to place the vehicle 602 into the safe exigency-ingress for and by one or more first responders. In response to obtaining that indication, the vehicle safety system 634 performs vehicular safety measures taken to increase the safety to the one or more first responders during an exigency ingress into the vehicle and generate vehicle-proximity notifications directing the one or more first responders to perform the exigency ingress into the vehicle.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference for all purposes.

The EVB 670 is a battery used to power the electric motors of a battery electric vehicle (BEV) or hybrid electric vehicle (REV). These batteries are usually rechargeable batteries specifically designed for a high ampere-hour (or kilowatt-hour) capacity. In some instances, the EVB 670 may be a high-voltage battery, which may be 48-400 or more volts, for example. An EVB may be called a traction battery Although depicted in FIG. 6 as residing in the memory system 618 for illustrative purposes, it is contemplated that the in-vehicle event component 620, the external-vehicle event component 622, the impact response component 624, the illumination control component 626, the one or more system controllers 628, and the one or more maps 630 may additionally, or alternatively, be accessible to the vehicle 602 (e.g., stored on, or otherwise accessible by, memory remote from the vehicle 602, such as, for example, on memory system 654 of a remote computing device 650). Similarly, the event detection and classifier component 640, the exigency-ingress activation component 642, the safety-measure component 644, and the first-responder vehicle-proximity notification component 646 are depicted as residing in a memory system 638 of the vehicle safety system 634, one or more of these components may additionally, or alternatively, be implemented within vehicle computing device(s) 604 or may be accessible to the vehicle 602 (e.g., stored on, or otherwise accessible by, memory remote from the vehicle 602, such as, for example, on the memory system 654 of the remote computing device 650).

In at least one example, the in-vehicle event component 620 may include functionality to sense events that occur inside the vehicle 602. For example, the occupant of the vehicle may purposefully trigger the activation of the safety exigency-ingress mode. The occupant may do this by pressing the emergency button 510 or selecting that option using a special-purpose application on their mobile device. In other instances, the microphone 506 may capture a special command word, and the in-vehicle event component 620 may include voice-recognition functionality to recognize the special command word that activates the safety exigency-ingress mode.

In some instances, the in-vehicle event component 620 may receive input regarding an in-vehicle medical emergency. For example, using voice-recognition and behavioral functionality, the in-vehicle event component 620 may determine that the occupant needs emergency assistance based on audio captured by the microphone 506 and video captured by an interior camera (not shown). In another example, an occupant may be experiencing a sudden severe medical difficulty and calls out for "help" or may declare that they are having a "heart attack" and that they need assistance. In still another example, the in-vehicle event component 620 may seek an "all's well" response from the occupant after a minor impact.

In other instances, the in-vehicle event component 620 may receive information related to other in-vehicle emergency conditions. For example, the in-vehicle event component 620 may receive an indication of smoke and/or fire detected in the interior of the vehicle 602 by the smoke/fire detector.

In some instances, the in-vehicle event component 620 may perceive that the in-vehicle behavior of the one or more occupants may be potentially dangerous. That is, it may be dangerous to themselves, to others in the vehicle, to pedestrians, or perhaps other vehicles. For example, the in-vehicle event component 620 may perceive an occupant's behavior as threatening to other passengers.

In addition, an occupant may become incapacitated. This may be detected, at least in part, by data sensed by a wearable (e.g., watch) worn by the user and/or interior cameras and microphones. Based on such data, a perception system of the vehicle may determine that the occupant is incapacitated. If so, the in-vehicle event component 620 may determine that an incapacitated occupant is a triggering event.

In another instance, the in-vehicle event component 620 may determine that an infant is alone in a car seat and detect excessively low or high ambient or interior temperature. More generally, the in-vehicle event component 620 tracks a potentially dangerous situation of an abandoned child or pet in the vehicle 602 and an excessive vehicular temperature environment.

In at least one example, the external-vehicle event component 622 may include functionality to sense events that occur outside the vehicle 602. For example, the external-vehicle event component 622 may detect an approaching emergency vehicle (such as an ambulance or fire truck) with their sirens or emergency signal activated. In other instances, the external-vehicle event component 622 may sense the approach of humans, first responders, or a key holder to the vehicle 602. The keyholder is a person possessing a uniquely identified key or fob that wirelessly identifies itself to the vehicle 602 to gain access to the vehicle.

In at least one example, the external-vehicle event component 622 may include functionality to communicate with remote operations 660. The remote operations 660 may also be called teleoperations. The remote operations 660 includes one or more computing devices 650 with one or more human operators or teleoperators. As the name implies, the remote operations 660 is physically remote from the vehicle 602, but wirelessly in communication with the vehicle 602 via the one or more communication connection(s) 610. Such communication includes data, control, audio, and/or video.

The remote operations 660 monitors and tracks the vehicle 602 and its systems, sensors, and components. The remote operations 660 may control or direct some aspects of the vehicle's actions, such as navigation, safety, and the like. Indeed, in some instances, the teleoperators in the remote operations 660 may drive the vehicle 602.

In some instances, a first responder may contact the remote operations 660 and request exigency ingress into the vehicle 602. Presuming the request is authorized and the need for exigency ingress is confirmed, a teleoperator at the remote operations 660 sends an indication to the vehicle 602 to permit an exigency ingress into the vehicle by one or more first responders. The indication from the remote operations 660 activates or triggers the safety exigency-ingress mode for the vehicle 602.

For example, the first responder may observe an occupant in apparent distress in the vehicle 602 while that vehicle travels on the road. The first responder may contact the remote operations 660, identify themselves, and the vehicle 602, and request exigency ingress to that vehicle to check on the safety of the occupant. Once verified and confirmed, the remote operations 660 may send an exigency-ingress mode activation indication to the vehicle 602. In response, the vehicle 602 enters into the safety exigency-ingress mode.

Consequently, the vehicle 602 safely pulls over off the road and comes to a halt. The first responders safely approach the vehicle 602. Using the techniques described herein, the first responders may open the door 244 of the vehicle 102 and extricate the occupant therefrom.

Additional examples that may be performed by remote operations 660 may be found in U.S. Patent Application Publication No. 20200183394 and U.S. Pat. Nos. 10,303,961 and 10,268,191, which are incorporated by reference herein.

In some instances, impact response component 624 may sense a vehicular impact, classify that impact, and take immediate post-impact actions accordingly. In some implementations, a vehicular impact may be classified as one of several differing levels. The differing levels are intended to represent the impacts of increasing potential for vehicular damage. For example, one of the levels may have an impact sufficient enough to deploy the occupant restraints.

In some examples, the illumination control component 626 may control the illumination of the interior and exterior lights, the lit signs, and the screens of the vehicle 602. For example, the illumination control component 626 may control the illumination of the vehicle-interior lights 220, the vehicle-exterior lights 222 and 224, the mode-activated illuminated signage 230, the pillar lamp 242 to illuminate the door-release lever, and the display screen 504. The illumination control component 626 may control the brightness, hue, and/or messages of the interior and exterior lights, the lit signs, and the screens of the vehicle 602.

In at least one example, the vehicle computing device(s) 604 may include one or more system controllers 628, which may be configured to control steering, propulsion, braking, safety, emitters, communication, and other systems of the vehicle 602. The system controller(s) 628 may communicate with and/or control corresponding systems of the drive system(s) 614 and/or other components of the vehicle 602.

The memory system 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retro-reflectivity information, BRDF information, BSSRDF information, and the like). In one example, a map may include a three-dimensional mesh of the environment. In some examples, the vehicle 602 may be controlled based at least in part on the maps 630.

In some examples, the one or more maps 630 may be stored on a remote computing device(s) (such as the computing device(s) 650) accessible via the network(s) 648. In some examples, multiple maps 630 may be stored based on, for example, a characteristic (e.g., type of entity, time of day, day of the week, the season of the year, etc.). Storing multiple maps 630 may have similar memory requirements, but increase the speed at which data in a map may be accessed.

The vehicle safety system 634 may include the event detection and classifier component 640 configured to detect an event and classify it as one that triggers the safety exigency-ingress mode for the vehicle 602. If it does, then the event detection and classifier component 640 produces an indication to permit an exigency ingress into the vehicle 602 by one or more first responders. That is, the event detection and classifier component 640 may send the indication to activate the safety exigency-ingress mode or state of the vehicle 602.

For example, the event detection and classifier component 640 may detect and classify the pressing of the emergency button 510 or selecting that option using the special-purpose application on their mobile device as a triggering event. In other instances, the event detection and classifier component 640 may detect and classify the capture a voice-recognized special command word as a triggering event.

In some instances, the event detection and classifier component 640 may detect and classify a detected in-vehicle medical emergency as a triggering event. In other instances, the event detection and classifier component 640 may detect and classify other in-vehicle emergency conditions (e.g., detected fire) as a triggering event.

In some instances, the event detection and classifier component 640 may detect and classify potentially dangerous in-vehicle behavior as a triggering event. In another instance, the event detection and classifier component 640 may detect and classify a potentially dangerous situation of an abandoned child or pet in the vehicle 602 and an excessive vehicular temperature environment as a triggering event. In some instances, the event detection and classifier component 640 may detect and classify a situation involving an approaching emergency vehicle as a triggering event.

In some instances, the event detection and classifier component 640 may detect and classify a vehicular impact as a triggering event. In some instances, only level 2 impacts may be classified as a triggering event. In other instances, level 0 or 1 combined with other factors (e.g., lack of response from an occupant) may be a triggering event.

The vehicle safety system 634 may include the exigency-ingress activation component 642 configured to activate or trigger the safety exigency-ingress mode for the vehicle 602 once the exigency-ingress activation component 642 obtains the indication to permit an exigency ingress into the vehicle by one or more first responders.

Once the exigency-ingress mode is activated, the safety-measure component 644 is configured to perform one or more vehicular safety measures taken to increase the safety to the one or more first responders during an exigency ingress into the vehicle 602.

For example, the safety-measure component 644 may initiate a safe halting the vehicle 602. To this end, the safety-measure component 644 may cooperate with and/or control the drive system(s) 614 and/or other components of the vehicle 602. For example, this action includes identifying an accessible nearby location that is away from and/or protected from traffic and navigating the vehicle 602 to that location. An ample shoulder of a roadside is an example of such a location.

In another instance, the safety-measure component 644 may initiate and control the illumination of the interior and exterior lights of the vehicle 602. To this end, the safety-measure component 644 may cooperate with and/or control the illumination control component 626 and/or other components of the vehicle 602. For example, the illumination control component 626 may control the illumination of the vehicle-interior lights 220 and the vehicle-exterior lights 222 and 224. With the illumination control component 626, the safety-measure component 644 may control the brightness, hue, and/or messages of the interior and exterior lights of the vehicle 602.

In some instances, the safety-measure component 644 may initiate the disconnection of EVB of the vehicle 602. To this end, the safety-measure component 644 may cooperate with and/or control the other components of the vehicle 602. Disconnecting the EVB reduces the change of occupant or a first responder receiving an electric shock when ingress or egress of the vehicle 602.

In some instances, the safety-measure component 644 may initiate audio and/or video communications with remote operations 660, in-vehicle occupants of the vehicle 602, and/or a first responder. Similarly, the safety-measure component 644 may initiate communication with emergency services (e.g., calling 911). To these ends, the safety-measure component 644 may cooperate with and/or control the one or more communication connection(s) 610, the microphone 506, the speakers 508, the communications device, and/or the other components of the vehicle 602.

In some instances, the safety-measure component 644 may initiate sharing location and direction-of-travel information of the vehicle 602 with first responders. To this end, the safety-measure component 644 may cooperate with and/or control the one or more communication connection(s) 610, the one or more sensor system(s) 606, remote operations 660, and/or the other components of the vehicle 602. The location and direction-of-travel information help the first responders to quickly locate the vehicle 602 and quickly execute exigency ingress into the vehicle.

Once the exigency-ingress mode is activated, the first-responder vehicle-proximity notification component 646 is configured to generate one or more vehicle-proximity notifications directing the one or more first responders to perform the exigency ingress into the vehicle. That is, the first-responder vehicle-proximity notification component 646 may generate notifications to those in the proximity of the vehicle regarding safety exigency-ingress mode. Of course, first responders are expected to be those in proximity to the vehicle when it is in the safety exigency-ingress mode.

In some instances, the first-responder vehicle-proximity notification component 646 may initiate an exterior audio message of the vehicle 602 to notify the first responders about the exigency-ingress mode of the vehicle, audio communication with the occupant in the vehicle, audio communication with the teleoperator at the remote operations 660, and/or other safety messages. To this end, the first-responder vehicle-proximity notification component 646 may cooperate with and/or control the one or more communication connection(s) 610, microphone 506, speakers 508, the communications device, and/or the other components of the vehicle 602.

In some instances, the first-responder vehicle-proximity notification component 646 may facilitate the presentation of printed textual message regarding door-release lever, the presentation of graphical direction indicators regarding door-release lever, and/or the presentation of directions regarding door-release lever on the deployed vehicle airbag curtains 250 and 252 of the vehicle. To this end, the first-responder vehicle-proximity notification component 646 may cooperate with and/or control the impact response component 624, the occupant-protection system (not shown), the occupant restraints 250 and 252, and/or the other components of the vehicle.

In some instances, the first-responder vehicle-proximity notification component 646 may present a notification (e.g., a message) regarding the disconnection of the EVB of the vehicle 602. To this end, the first-responder vehicle-proximity notification component 646 may cooperate with and/or control illumination control component 626, the impact response component 624, the occupant-protection system (not shown), the occupant restraints 250 and 252, the one or more communication connection(s) 610, microphone 506, speakers 508, the communications device, and/or the other components of the vehicle 602. For example, such a message may be printed on a deployed occupant restraint, presented on a screen, be part of a lit signage, and/or announced via an audio message broadcast around the vehicle 602.

In another instance, the first-responder vehicle-proximity notification component 646 may initiate and control the illumination of the interior and exterior lights, the lit signs, and the screens of the vehicle 602. To this end, the first-responder vehicle-proximity notification component 646 may cooperate with and/or control the illumination control component 626 and/or other components of the vehicle 602. For example, the illumination control component 626 may control the illumination of the vehicle-interior lights 220, the vehicle-exterior lights 222 and 224, the mode-activated illuminated signage 230, the pillar lamp 242 to illuminate the door-release lever, on-screen video message, and the display screen 504. With the illumination control component 626, the first-responder vehicle-proximity notification component 646 may control the brightness, hue, and/or messages of the interior and exterior lights, the lit signs, and the screens of the vehicle 602.

As can be understood, the components discussed herein (e.g., the in-vehicle event component 620, the external-vehicle event component 622, the impact response component 624, the illumination control component 626, the one or more system controllers 628, and the one or more maps 630, and the vehicle safety system 634 including the event detection and classifier component 640, the exigency-ingress activation component 642, the safety-measure component 644, and the first-responder vehicle-proximity notification component 646) are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory systems 618 and 638 (and the memory system 654, discussed below) may be implemented as a neural network.

In at least one example, the sensor system(s) 606 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the LIDAR sensors may include individual LIDAR sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device(s) 604. Additionally or alternatively, the sensor system(s) 606 may send sensor data, via the one or more networks 648, to the vehicle safety system 634 and/or to computing device(s) 650 at a particular frequency, after a lapse of a predetermined period of time, in near real-time, etc.

The vehicle 602 may also include one or more emitters 608 for emitting light and/or sound, as described above. The emitters 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or another indicator of vehicle action (e.g., indicator lights, signs, light arrays, etc.), and one or more audio emitters (e.g., speakers, speaker arrays, horns, etc.) to communicate with pedestrians or other nearby vehicles audibly, one or more of which comprising acoustic beam steering technology.

Vehicle 602 may also include the one or more communication connection(s) 610 that enables the communication between the vehicle 602 and one or more another local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., the computing device(s) 650, other nearby vehicles, etc.) and/or remote operations 660 for receiving sensor data.

The communications connection(s) 610 may include physical and/or logical interfaces for connecting the vehicle computing device(s) 604 to another computing device or a network, such as the network(s) 648. For example, the communications connection(s) 610 can enable Wi-Fi-based communication such as via frequencies defined by the IEEE 802.11 standards, short-range wireless frequencies such as Bluetooth, cellular communication (e.g., 2G, 3G, 4G, 4G LTE, 6G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate the loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive system controller that may receive and preprocess data from the sensor system(s) and to control the operation of the various vehicle systems. In some examples, the drive system controller may include one or more processors and memory communicatively coupled with the one or more processors. The memory may store one or more components to perform various functionalities of the drive system(s) 614. Furthermore, the drive system(s) 614 may also include one or more communication connection(s) that enable communication by the respective drive system with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

The computing device(s) 650 may include processor(s) 652 and the memory system 654 storing a remote operations component 656 and a first-responder communications component 658. In some examples, the remote operations component 656 may include functionality to monitors and tracks vehicle 602 and its systems, sensors, and components. In such examples, the remote operations component 656 may control or direct some aspects of the vehicle's actions, such as navigation, safety, and the like. In various examples, the first-responder communications (FR comm) component 658 may be configured to communicate with first responders. In some examples, the first-responder communications component 658 may be configured to sharing location and direction-of-travel information of vehicle 602 with first responders.

In some instances, a first responder may contact the remote operations 660 and request exigency ingress into the vehicle 602. Presuming the request is authorized and the need for exigency ingress is confirmed, a teleoperator at the remote operations 660 send an indication to the vehicle 602 to permit an exigency ingress into the vehicle by one or more first responders. The indication from the remote operations 660 activates or triggers the safety exigency-ingress mode for the vehicle 602.

The processor(s) 616 of the vehicle 602, processor(s) 636 of the vehicle safety system 634, and/or the processor(s) 652 of the computing device(s) 650 may be any suitable processor capable of executing instructions to process data and perform operations as described herein. By way of example and not limitation, the processor(s) 616, 636, and 652 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory systems 618, 638, and/or 654 are examples of non-transitory computer-readable media. The memory systems 618, 638, and/or 654 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory systems 618, 638, and/or 654 may include at least a working memory and a storage memory. For example, the working memory may be a high-speed memory of limited capacity (e.g., cache memory) that is used for storing data to be operated on by the processor(s) 616, 636, and/or 652. In some instances, the memory systems 618, 638, and/or 654 may include a storage memory that may be a lower-speed memory of relatively large capacity that is used for long-term storage of data. In some cases, the processor(s) 616, 636, and/or 652 cannot operate directly on data that is stored in the storage memory, and data may need to be loaded into a working memory for performing operations based on the data, as discussed herein.

It should be noted that while FIG. 6 is illustrated as a distributed system. In alternative examples, components of the vehicle 602 may be associated with the computing device(s) 650 and/or components of the computing device(s) 650 may be associated with the vehicle 602. That is, the vehicle 602 may perform one or more of the functions associated with the computing device(s) 650, and vice versa.

Figure 7:
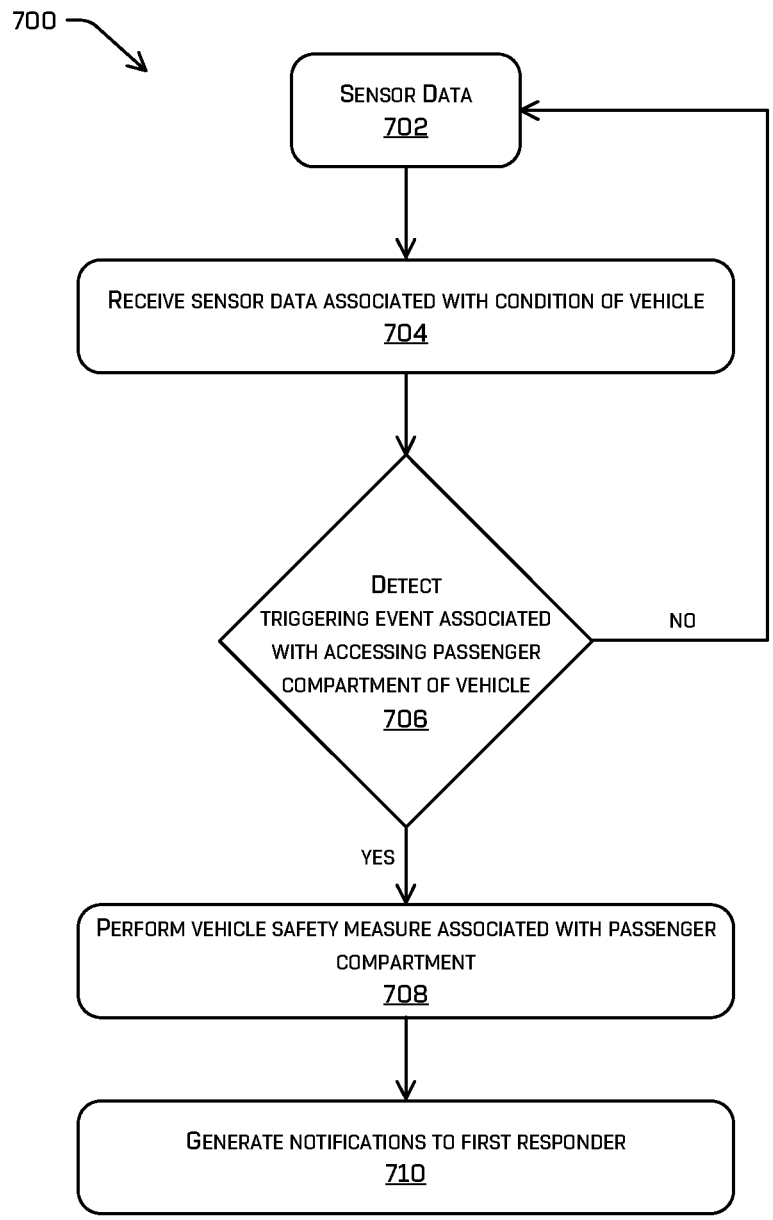
FIG. 7 illustrates an example process of safe exigency ingress into a vehicle for and by first responders, in accordance with certain techniques described herein.

FIG. 7 illustrates an example process 700 for safe exigency ingress into a vehicle by first responders. In some instances, some or all of the example process 700 may be performed by one or more components in the computing system 600, as described herein. For instance, example process 700 may be described with reference to the vehicle safety system 634 and the one or more sensor system(s) 606 of FIG. 6, based on state data received from the components of the vehicle computing device(s) 604. However, it is contemplated that example process 700 also may utilize computing environments and architectures other than those depicted in the computing system 600.

At operation 704, the vehicle safety system 634 receives sensor data 702 from a sensor of the vehicle. The vehicle may be similar or identical to vehicle 102 and/or vehicle 602, as discussed above.

The sensor data 702 may be, for example, provided by the one or more sensor system(s) 606, such as: LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. In at least some examples, sensor data 702 may comprise signals received from, for example, the emergency button 510 on the vehicle, a user's smartphone or another smart device, a remote server, or otherwise.

In other instances, other systems may provide the sensor data 702 to the operation 704. For example, the following systems of the vehicle 602 may provide the sensor data 702: the impact response component 624, the one or more system controllers 628, the one or more communication connections 610, the direct connection 612, the one or more drive systems 614, and the EVB 670.

In some instances, the data might not be provided by sensors per se. Rather, some implementations may employ data that is associated with a condition of the vehicle, but such data is provided by sensors. For example, data about the following may be provided: one or more error codes associated with one or more components and/or subcomponents (e.g., loss of pressure in a tire or fluidic system of the vehicle, the temperature of a battery, a low or overvoltage signal from a battery, etc.), a divergence from a planned trajectory more than a threshold amount (e.g., where the vehicle is unable to move along a planned trajectory), a loss of power and/or communication, and/or an instruction from a remote operations computing device.

The received data is associated with the condition of the vehicle. For example, the condition of the vehicle may include a relative or absolute location, distance, orientation, or direction-of-travel that may be determined from the sensor data 702. In another example, the include the condition of the vehicle may include perception of activity in the interior or around the exterior of the vehicle as may be determined from the sensor data 702.

At operation 706, the vehicle safety system 634 may detect, based at least in part on the data associated with a condition of the vehicle (e.g., from sensors, components, remote signals, passenger input, etc.), a triggering event associated with accessing (i.e., ingress of) a passenger compartment of the vehicle. The vehicle safety system 634 may classify the event as one that triggers the safety exigency-ingress mode for the vehicle.

In some instances, the triggering event may be initiated by one of three sources: an occupant, remote operations, or automatically by the vehicle itself. The occupant (e.g., passenger) of the vehicle may purposefully trigger the activation of the safety exigency-ingress mode. The occupant of the vehicle may be a driver or passenger of the vehicle. Operators in the remote operations may purposefully trigger the safety exigency-ingress mode in response, for example, to a request from first responders to do so. Systems on the vehicle itself may detect a vehicular triggering condition and automatically activate the safety exigency-ingress mode. For example, the vehicle may detect a vehicular impact that is significant enough to warrant intervention by first responders.

Many different events may trigger the activation of the safety exigency-ingress mode. In some instances, the vehicle may detect a sufficiently significant vehicular impact. For example, the trigger may be in response to both a detection that a vehicular impact has occurred, and the impact or damage was sufficient to warrant assistance from a first responder potentially. In some instances, the impact or damage may be sufficient when vehicle airbag curtains (e.g., airbags) are deployed in response.

Other events that might trigger activation of the safety exigency-ingress mode include, for example, an indication of an attempt by a first responder to ingress the passenger compartment of the vehicle, input from a passenger of the vehicle, detection of a vehicular impact, detection of a temperature in the passenger compartment exceeding a threshold temperature, deployment of an occupant-protection system of the vehicle, detection of at least one of smoke or fire associated with the vehicle, detection of a thermal event (e.g., smoke and/or fire) in the passenger compartment, in-vehicle medical emergency, detection of a malfunction associated with a component of the vehicle, detection of proximity of an emergency vehicle, and/or an instruction from a remote operations computing device.

Some other events that may trigger activation of the safety exigency-ingress mode include, for example, voice-recognition command to activate an exigency ingress mode of the vehicle, detection of dangerous in-vehicle occupant behavior, and/or detection of abandoned child or pet and an excessive vehicular temperature environment.

Some events may be detected that are not classified as worthy of initiating the safety exigency-ingress mode. For example, a vehicular impact may be detected that may be deemed sufficiently minor not to warrant the safety exigency-ingress mode. An example of such a minor impact includes one where the occupant restraints are not deployed.

At operation 708, the vehicle safety system 634, in response to a detected triggering event, activates the safety exigency-ingress mode for the vehicle. This activation may include the production, transmission, or reception of the indication to permit the exigency ingress into the vehicle by the one or more first responders.

When in the safety exigency-ingress mode, the vehicle safety system 634 may perform, based at least in part on the triggering event, a vehicular safety measure associated with accessing the passenger compartment of the vehicle. In some instances, the vehicle safety system 634 may perform a vehicular safety measure that provides an indication of how to enter the passenger compartment of the vehicle.

For example, the safety measures taken when the vehicle is in safety exigency-ingress mode include, for example, illuminating an exigency access mechanism, deploying the airbags including a visual indicator showing how to ingress the passenger compartment of the vehicle, outputting an audible instruction describing how to ingress the passenger compartment of the vehicle, and/or initiating a communication connection between a communication device in the interior of the passenger compartment, remote operations, and/or the communication device of the first responder.

In other examples described herein, the safety measures taken when the vehicle is in safety exigency-ingress mode may include, for example, safely halting the vehicle, interior lights illumination, exterior lights illumination, disconnection of an electric-vehicle battery (EVB), and/or communication with emergency services (e.g., calling 911).

At operation 710, the vehicle safety system 634 may generate, in response to the obtained indication, a vehicle-proximity notification directing the one or more first responders to perform the exigency ingress into the vehicle. That is, the vehicle safety system 634 may generate notifications to those in the proximity of the vehicle regarding safety exigency-ingress mode. Of course, first responders are expected to be those in proximity to the vehicle when it is in the safety exigency-ingress mode.

In various examples described herein, the vehicle-proximity notifications provided when the vehicle is in safety exigency-ingress mode include, for example, an indication of how to ingress the passenger compartment of the vehicle, the data associated with the condition of the vehicle, image data associated with an interior of the vehicle, audio data associated with an interior of the vehicle, data associated with an exterior environment proximate the vehicle, location data associated with the vehicle, and/or a direction of travel associated with the vehicle.

In various other examples described herein, the vehicle-proximity notifications provided when the vehicle is in a safety exigency-ingress mode may include, for example, an on-screen textual message, on-screen video message, exterior audio message, illumination of a door-release lever, presentation of printed textual message regarding door-release lever, presentation of graphical direction indicators regarding door-release lever, presentation of directions regarding door-release lever on a deployed vehicle airbag curtain, sharing vehicle location information with first responders, sharing vehicle direction-of-travel information with first responders, and message regarding disconnection of the EVB.

Example Clauses

A. A vehicle comprising: a sensor; one or more processors; and one or more non-transitory computer-readable media storing computer-executable instructions that, when executed, cause the vehicle to perform operations comprising: receiving, from the sensor, sensor data associated with a condition of the vehicle; detecting, based at least in part on the sensor data associated with the condition of the vehicle, a triggering event associated with ingress of a passenger compartment of the vehicle; and performing, based at least in part on the triggering event, a vehicular safety measure providing an indication of how to enter into the passenger compartment of the vehicle.

B. The vehicle of paragraph A, the operations further comprising generating, based at least in part on the triggering event, a notification to a first responder, the notification including at least one of: the indication of how to ingress the passenger compartment of the vehicle; the sensor data associated with the condition of the vehicle; image data associated with an interior of the vehicle; audio data associated with an interior of the vehicle; sensor data associated with an exterior environment proximate to the vehicle; location data associated with the vehicle; or a direction of travel associated with the vehicle.

C. The vehicle of paragraphs A or B, wherein the triggering event comprises at least one of: input from a passenger of the vehicle; detection of a state of the passenger; detection of an impact of an object with the vehicle; detection of a temperature in the passenger compartment exceeding a threshold temperature; deployment of an occupant-protection system of the vehicle; detection of at least one of smoke or fire associated with the vehicle; detection of a malfunction associated with a component of the vehicle; detection of proximity of an emergency vehicle; or an instruction from a remote operations computing device.

D. The vehicle of paragraphs A, B, or C, wherein the vehicular safety measure comprises: illuminating an exigency access mechanism; and deploying an airbag including a visual indicator showing how to enter into the passenger compartment of the vehicle.

E. A method comprising: receiving data associated with a condition of a vehicle; detecting, based at least in part on the data associated with the condition of the vehicle, a triggering event associated with accessing a passenger compartment of the vehicle; and performing, based at least in part on the triggering event, a vehicular safety measure associated with accessing the passenger compartment of the vehicle.

F. The method of paragraph E, wherein the performing the vehicular safety measure includes providing an indication of how to enter into the passenger compartment of the vehicle.

G. The method of paragraphs E and F further comprising generating, based at least in part on the triggering event, a notification to a first responder, the notification including at least one of: an indication of how to ingress the passenger compartment of the vehicle; the data associated with the condition of the vehicle; image data associated with an interior of the vehicle; audio data associated with an interior of the vehicle; data associated with an exterior environment proximate to the vehicle; location data associated with the vehicle; or a direction of travel associated with the vehicle.

H. The method of paragraphs E, F, or G, wherein the triggering event comprises at least one of: input from a passenger of the vehicle; detection of a state of the passenger; detection of an impact of an object with the vehicle; detection of a temperature in the passenger compartment exceeding a threshold temperature; deployment of an occupant protection system of the vehicle; detection of at least one of smoke or fire associated with the vehicle; detection of a malfunction associated with a component of the vehicle; detection of proximity of an emergency vehicle; or an instruction from a remote operations computing device.

I. The method of paragraphs E, F, G, or H, wherein the triggering event being initiated by at least one of: a first responder; a passenger of the vehicle; the vehicle; or a remote operations computing device.

J. The method of paragraphs E, F, G, H, or I, wherein the vehicular safety measure comprises: illuminating an exigency access mechanism; and deploying an occupant-protection system including a visual indicator showing how to ingress the passenger compartment of the vehicle.

K. The method of paragraph J, wherein the vehicular safety measure further comprises at least one of: outputting an audible instruction describing how to ingress the passenger compartment of the vehicle; or initiating a communication connection between a communication device in an interior of the passenger compartment and a communication device of a first responder.

L. The method of paragraphs E, F, G, H, I, J, or L, wherein the vehicular safety measure includes disconnection of an electric-vehicle battery.

M. One or more non transitory computer-readable media storing instructions executable by a processor, wherein the instructions, when executed, cause the processor to perform operations comprising: receiving, from a sensor, sensor data associated with a condition of a vehicle; detecting, based at least in part on the sensor data associated with the condition of the vehicle, a triggering event associated with accessing a passenger compartment of the vehicle; and performing, based at least in part on the triggering event, a vehicular safety measure associated with accessing the passenger compartment of the vehicle.

N. The one or more non transitory computer-readable media of paragraph M, wherein the performing the vehicular safety measure includes providing an indication of how to enter into the passenger compartment of the vehicle.

O. The one or more non transitory computer-readable media of paragraphs M and N, wherein the operation further comprises generating, based at least in part on the triggering event, a notification to a first responder, the notification including at least one of: an indication of how to ingress the passenger compartment of the vehicle; the sensor data associated with the condition of the vehicle; image data associated with an interior of the vehicle; audio data associated with an interior of the vehicle; sensor data associated with an exterior environment proximate to the vehicle; location data associated with the vehicle; or a direction of travel associated with the vehicle.

P. The one or more non transitory computer-readable media of paragraphs M, N, or O, wherein the triggering event comprises at least one of: input from a passenger of the vehicle; detection of a state of the passenger; detection of an impact of an object with the vehicle; detection of a temperature in the passenger compartment exceeding a threshold temperature; deployment of an occupant-protection system of the vehicle; detection of at least one of smoke or fire associated with the vehicle; detection of a malfunction associated with a component of the vehicle; detection of proximity of an emergency vehicle; or an instruction from a remote operations computing device.

Q. The one or more non transitory computer-readable media of paragraphs M, N, O, and P, wherein the triggering event being initiated by at least one of: a first responder; a passenger of the vehicle; the vehicle; or a remote operations computing device.

R. The one or more non transitory computer-readable media of paragraphs M, N, O, P, and Q, wherein the vehicular safety measure comprises: illuminating an exigency access mechanism; and deploying an occupant-protection system including a visual indicator showing how to ingress the passenger compartment of the vehicle.

S. The one or more non transitory computer-readable media of paragraphs M, N, O, P, Q, and R, wherein the vehicular safety measure includes disconnection of an electric-vehicle battery, the operations further comprising generating, based at least in part on the triggering event, a notification to a first responder regarding the disconnection of the electric-vehicle battery.

T. The one or more non transitory computer-readable media of paragraphs M, N, O, P, Q, R, and S, wherein the vehicle is an autonomous or semi-autonomous vehicle.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, components, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:
   a sensor;
   one or more processors; and
   one or more non-transitory computer-readable media storing computer-executable instructions that, when executed, cause the vehicle to perform operations comprising:
      receiving, from the sensor, sensor data associated with a condition of the vehicle;
      detecting, based at least in part on the sensor data associated with the condition of the vehicle, a triggering event associated with ingress of a passenger compartment of the vehicle; and
      performing, based at least in part on the triggering event, a vehicular safety measure providing an indication of how to enter into the passenger compartment of the vehicle, wherein the vehicular safety measure includes outputting an audible instruction describing how to ingress the passenger compartment of the vehicle.

2. The vehicle of claim 1, the operations further comprising generating, based at least in part on the triggering event, a notification to a first responder, the notification including at least one of:

the indication of how to ingress the passenger compartment of the vehicle;
the sensor data associated with the condition of the vehicle;
image data associated with an interior of the vehicle;
audio data associated with an interior of the vehicle;
sensor data associated with an exterior environment proximate to the vehicle;
location data associated with the vehicle; or
a direction of travel associated with the vehicle.

3. The vehicle of claim 1, wherein the triggering event comprises at least one of:

input from a passenger of the vehicle;
detection of a state of the passenger;
detection of an impact of an object with the vehicle;
detection of a temperature in the passenger compartment exceeding a threshold temperature;
deployment of an occupant-protection system of the vehicle;
detection of at least one of smoke or fire associated with the vehicle;
detection of a malfunction associated with a component of the vehicle;
detection of proximity of an emergency vehicle; or
an instruction from a remote operations computing device.

4. The vehicle of claim 1, wherein the vehicular safety measure comprises:

illuminating an exigency access mechanism; and
deploying an airbag including a visual indicator showing how to enter into the passenger compartment of the vehicle.

5. A method comprising:

receiving data associated with a condition of a vehicle;
detecting, based at least in part on the data associated with the condition of the vehicle, a triggering event associated with accessing a passenger compartment of the vehicle; and
performing, based at least in part on the triggering event, a vehicular safety measure associated with accessing the passenger compartment of the vehicle,
wherein the vehicular safety measure includes disconnection of an electric-vehicle battery.

6. The method of claim 5, wherein the performing the vehicular safety measure includes providing an indication of how to enter into the passenger compartment of the vehicle.

7. The method of claim 5 further comprising generating, based at least in part on the triggering event, a notification to a first responder, the notification including at least one of:

an indication of how to ingress the passenger compartment of the vehicle;
the data associated with the condition of the vehicle;
image data associated with an interior of the vehicle;
audio data associated with an interior of the vehicle;
data associated with an exterior environment proximate to the vehicle;
location data associated with the vehicle; or
a direction of travel associated with the vehicle.

8. The method of claim 5, wherein the triggering event comprises at least one of:

input from a passenger of the vehicle;
detection of a state of the passenger;
detection of an impact of an object with the vehicle;
detection of a temperature in the passenger compartment exceeding a threshold temperature;
deployment of an occupant protection system of the vehicle;
detection of at least one of smoke or fire associated with the vehicle;
detection of a malfunction associated with a component of the vehicle;
detection of proximity of an emergency vehicle; or
an instruction from a remote operations computing device.

9. The method of claim 5, wherein the triggering event being initiated by at least one of:

a first responder;
a passenger of the vehicle;
the vehicle; or
a remote operations computing device.

10. The method of claim 5, wherein the vehicular safety measure comprises:

illuminating an exigency access mechanism; and
deploying an occupant-protection system including a visual indicator showing how to ingress the passenger compartment of the vehicle.

11. The method of claim 10, wherein the vehicular safety measure further comprises at least one of:

outputting an audible instruction describing how to ingress the passenger compartment of the vehicle; or
initiating a communication connection between a communication device in an interior of the passenger compartment and a communication device of a first responder.

12. The method of claim 5, wherein the vehicle safety measure further includes illuminating a door release lever.

13. One or more non-transitory computer-readable media storing instructions executable by a processor, wherein the instructions, when executed, cause the processor to perform operations comprising:

receiving, from a sensor, sensor data associated with a condition of a vehicle;
detecting, based at least in part on the sensor data associated with the condition of the vehicle, a triggering event associated with accessing a passenger compartment of the vehicle; and
performing, based at least in part on the triggering event, a vehicular safety measure associated with accessing the passenger compartment of the vehicle,
wherein the vehicular safety measure includes disconnection of an electric-vehicle battery.

14. The one or more non-transitory computer-readable media of claim 13, wherein the performing the vehicular safety measure includes providing an indication of how to enter into the passenger compartment of the vehicle.

15. The one or more non-transitory computer-readable media of claim 13, wherein the operations further comprises generating, based at least in part on the triggering event, a notification to a first responder, the notification including at least one of:

an indication of how to ingress the passenger compartment of the vehicle;

the sensor data associated with the condition of the vehicle;
image data associated with an interior of the vehicle;
audio data associated with an interior of the vehicle;
sensor data associated with an exterior environment proximate to the vehicle;
location data associated with the vehicle; or
a direction of travel associated with the vehicle.

16. The one or more non-transitory computer-readable media of claim 13, wherein the triggering event comprises at least one of:
input from a passenger of the vehicle;
detection of a state of the passenger;
detection of an impact of an object with the vehicle;
detection of a temperature in the passenger compartment exceeding a threshold temperature;
deployment of an occupant-protection system of the vehicle;
detection of at least one of smoke or fire associated with the vehicle;
detection of a malfunction associated with a component of the vehicle;
detection of proximity of an emergency vehicle; or
an instruction from a remote operations computing device.

17. The one or more non-transitory computer-readable media of claim 13, wherein the triggering event being initiated by at least one of:
a first responder;
a passenger of the vehicle;
the vehicle; or
a remote operations computing device.

18. The one or more non-transitory computer-readable media of claim 13, wherein the vehicular safety measure comprises:
illuminating an exigency access mechanism; and
deploying an occupant-protection system including a visual indicator showing how to ingress the passenger compartment of the vehicle.

19. The one or more non-transitory computer-readable media of claim 13, wherein the operations further comprising generating, based at least in part on the triggering event, a notification to a first responder regarding the disconnection of the electric-vehicle battery.

20. The one or more non-transitory computer-readable media of claim 13, wherein the vehicle is an autonomous or semi-autonomous vehicle.

\* \* \* \* \*